United States Patent

[11] 3,544,028

| [72] | Inventor | Elmer O. Wangerin<br>Rochester, New York |
|---|---|---|
| [21] | Appl. No. | 759,168 |
| [22] | Filed | Sept. 11, 1968 |
| [45] | Patented | Dec. 1, 1970 |
| [73] | Assignee | Eastman Kodak Company<br>Rochester, New York<br>a corporation of New Jersey |

[54] STRIP ANCHORING DEVICE
16 Claims, 10 Drawing Figs.

| [52] | U.S. Cl. | 242/74.1 |
|---|---|---|
| [51] | Int. Cl. | B65h 75/28 |
| [50] | Field of Search | 242/74.1, 74, 74.2 |

[56] References Cited
UNITED STATES PATENTS

| 3,387,800 | 6/1968 | Hoag | 242/74.2 |
|---|---|---|---|
| 1,209,593 | 12/1916 | Keiser | 242/74.1 |
| 3,220,664 | 11/1965 | Whitnah | 242/74.1 |

FOREIGN PATENTS

| 584,985 | 12/1924 | France | 242/74.1 |
|---|---|---|---|
| 1,111,009 | 7/1961 | Germany | 242/74.1 |

*Primary Examiner*—Nathan L. Mintz
*Attorneys*—Robert W. Hampton and R. Lewis Gable ABSTRACT: This disclosure relates to an anchoring device or member for securing a flexible strip to a reel. In one illustrative embodiment of this invention, the anchoring device takes the form of an H-shaped member of a suitably resilient material about which a loop of the flexible strip is disposed. More specifically, the loop of the flexible material is inserted through a slot of a hub of the reel and the anchoring member is then disposed within the loop. The anchoring device coacts with the interior of the hub to prevent the withdrawal of the strip from the hub and to present a resilient portion of the anchoring device for absorbing the force tending to withdraw the strip from the hub.

Patented Dec. 1, 1970

3,544,028

ELMER O. WANGERIN
INVENTOR.

BY R. Lewis Gable
Robert W Hampton

ATTORNEYS

ELMER O. WANGERIN
INVENTOR.

BY R. Lewis Galle
Robert W Hampton
ATTORNEYS 3,544,028

STRIP ANCHORING DEVICE

BACKGROUND OF THE INVENTION

1. Field of the Invention

This invention relates to anchoring members and more particularly to anchoring members for securing flexible strips to a reel.

The anchoring device or member of the present invention is especially adapted for securing extended lengths of photographic film to the hubs of reels about which the strips of photographic film are to be wound. Though this invention may be described with regard to strips of photographic film, it is understood that the device of the preset present invention could be used with equal facility and advantage to secure strips of other materials upon reels; and therefore, the following description is provided for illustrative purposes only.

2. Description of the Prior Art

In the art of displaying or exposing photographic film, a strip of the photographic film is unwound from a supply reel and taken up upon a takeup reel. Next, it may be desirable or necessary to rewind the film from the takeup reel to the supply reel. In order to prevent the strip from slipping off the supply reel, suitable means may be provided for securing the end of the strip to the supply reel. Upon completion of the unwinding of the strip from the supply reel, the momentum of the supply reel and the driving rotational torque applied to the takeup reel impose a considerable stress on the securing means and also on the strip of photographic film. This tension may cause the strip to be pulled from the supply reel and/or to break the strip.

In the prior art, U.S. Pat. No. 2,652,918, to Lippert, discloses the use of a plastic core to secure a strip to the hub of a reel. More particularly, the strip is disposed about and secured to the core by a metal clip. At least one dimension of the core is larger than the slot through which the strip is disposed thereby preventing the removal of the core and the strip from the hub of the reel. In U.S. Pat. No. 3,220,664, an elongated strip is secured to the hub of a reel by an anchoring means taking the form of a cylindrical sleeve. The end of the strip is disposed through a slit within the sleeve which has been alined with an opening of the hub. The sleeve is rotated within the hub so that an edge of the sleeve abuts a shoulder of the hub to thereby fasten the end of the strip to the reel. Further, German Pat. No. 1,111,009 discloses the use of a resilient member for securing an elongated strip to the hub of a reel. The resilient member has a pair of legs for allowing the anchoring member to be inserted within an opening of the hub. A portion of the anchoring member is of a larger dimension than the narrowest portion of the hub opening to thereby prevent the withdrawal of the anchoring member and the strip. Though the above-described prior art apparently allows for the securing of a strip to a reel, the anchoring member does not serve to absorb or relieve the tension applied to the strip as it is being unwound from the reel. Without such provision, the strip will have a tendency to break when subjected to the force of a single or repeated unwindings of the strip from a reel.

SUMMARY OF THE INVENTION

It is therefore an object of this invention to provide a new and improved anchoring member capable of securely attaching the end of a strip to the hub of a reel.

It is another object of the present invention to provide anew and improved anchoring member for securing an elongated strip to a reel, which anchoring member substantially absorbs the force imposed upon the strip by the momentum of the reel itself and the force tending to withdraw the film from the reel.

It is a still further object of this invention to provide a new and improved anchoring member for securing a strip of film to the hub of a reel in a manner that the anchoring member will orient itself within the hub to properly secure the strip.

In accordance with the teachings of this invention, the above and additional objects are accomplished by an anchoring member disposed within a hub to secure the strip thereto and to resiliently relieve the tension applied to the strip. More specifically, a loop of the strip is disposed through a slit into a chamber of the hub, and the anchoring member is disposed within the chamber to position a resilient portion of the anchoring member for absorbing the tension imposed upon the strip. In one illustrative embodiment of this invention, the anchoring member may have at least two arms which serve respectively to resiliently relieve the tension applied to the strip and to provide a point about which the anchoring member is rotated by the force exerted upon the strip. Further, the anchoring member coacts with the interior of the reel hub to restrict the rotation of the anchoring member thereby securing the strip to the reel.

BRIEF DESCRIPTION OF THE DRAWINGS

These and other objects and features of the present invention will become apparent when considered in view of the following description of the drawings in which which.

DESCRIPTION OF PREFERRED EMBODIMENTS

Figure 1A:
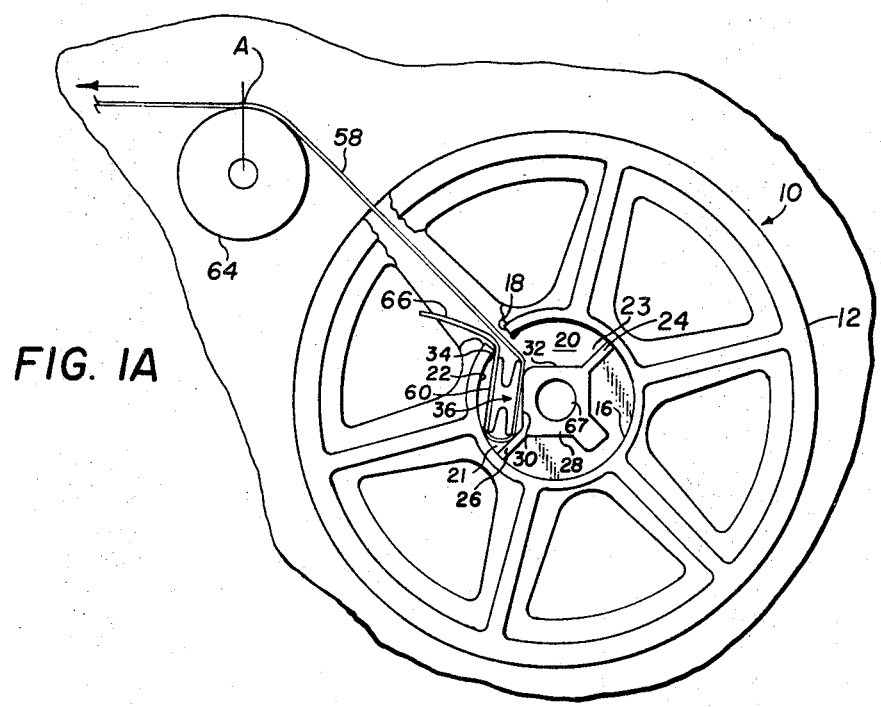
FIGS. 1A and 1B are side views of a reel and an anchoring member disposed within a hub of the reel so as to secure the strip in accordance with the teachings of this invention.
Figure 1B:
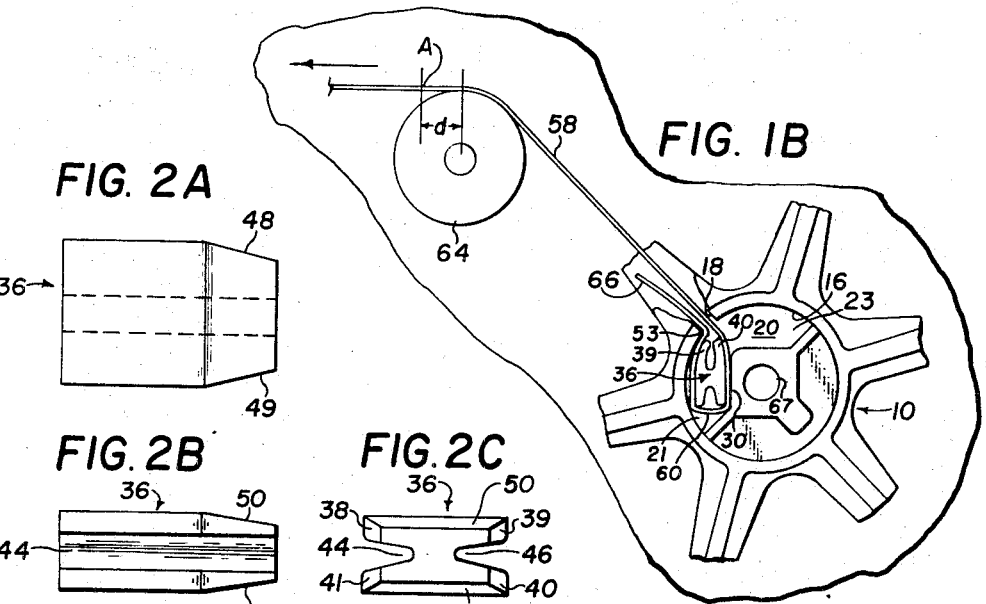

Referring now to the drawings and in particular to FIGS. 1A and 1B, there is shown a reel 10 to which a strip 58 of a material such as photographic film is to be secured by an anchoring member 36 in accordance with the teachings of this invention. As shown more clearly in FIG. 5, the reel 10 includes a pair of disks or flanges 12 and 14 which are secured together by a cylindrically-shaped hub 16. A slot 18 is provided within the hub 16 through which a loop 60 of the strip 58 is inserted. In order to rewind the strip 58 upon the reel 10, an opening 67 is provided into which may be inserted a mandrel (not shown) for imparting a rotational torque to the reel 1 reel 10. A chamber 10 chamber 20 is formed within approximately one-half of the hub 16 as defined by an arcuate surface 22 (i.e., the inner periphery of the hub 16), a pair of webs 24 and 26, and a boss 28. Further, the chamber 1 chamber 20 may be considered to be divided by the boss 28 into first and second sections 21 and 23 and 23, respectively. The boss 28 has a pair of flat surfaces 30 and 32 respectively associated with the first and second sections 21 and 23. A cord-shaped member 34 is disposed about and reinforces the slot 18 to prevent the force exerted upon the web or strip 58 from pulling the anchoring member 36 through the slot 18.

Figure 2A:
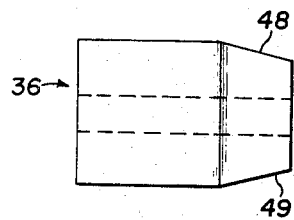
FIGS. 2A, 2B, and 2C are respectively plan, side and front views of the anchoring member, which is disposed with the reel as shown in FIGS. 1A and 1B.
Figures 2B, 2C:
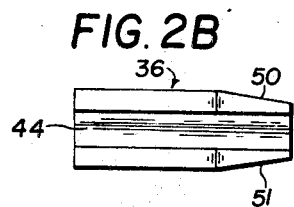

Referring now to FIGS. 2A, 2B and 2C, there is shown a preferred embodiment of the anchoring member 36 which is to be inserted within the loop 60 of the strip 8. In one illustrative embodiment, the anchoring member 36 may take the form of an H-shaped member having a first pair of legs 38 and 41 and a second pair of legs 39 and 40 extending from opposite sides thereof. As will be explained later in greater detail, the legs 38 to 41 provide resilient means to absorb the force exerted upon the strip 58. As shown in FIG. 2B, the pair of legs 38 and 41 form a slot 44 therebetween and the legs 39 and 40 form a slot 43 slot 46 therebetween. As shown more clearly in FIGS. 2A and 2C, the anchoring member 36 has a plurality of beveled surfaces 48, 49, 50 and 51 to aid the insertion of the anchoring member 36 within the loop 60 of the strip 58. In order to absorb the tension placed upon the strip 58, the anchoring member 36 is made of a resilient material so that portions thereof and in particular a pair of the legs 38 to 41 may give under the tension imposed thereon by the strip 58. In one particular illustrative embodiment of this invention, the resilient material of the anchoring member 36 may be a copolymer of ethylene vinal acetate and, in particular, the Bakelite EVA copolymer DODA 3269 as manufactured by the Union Carbide Corporation.

Referring now to FIGS. 1A and 1B, the reel 10 may be rotatably mounted upon a mandrel (not shown) which would be inserted into the opening 67. A length of the strip 58 is directed over an idler roller 64 and attached to the reel 10 in the following manner. A leading end 66 of the strip 58 is curved so as to form the loop 60. The loop 60 is inserted through the slot 18 of the hub 16, and the anchoring member 36 is disposed within the loop 60 to thereby secure the strip 68 to the reel as shown in FIG. 1A. Typically, the strip 58 would be wound upon the reel 10 before it is processed or projected by appropriate apparatus. In a preferred embodiment, the strip 58 would be wound upon the reel 10 by rotating the reel 10 in a counterclockwise direction as shown in FIG. 1A. In use, the strip 58 will be unwound from the reel 10 until, as shown in FIG. 1B, substantially the entire length of the strip 58 has been unwound from the reel 10 and the tension imparted to the strip 58 distorts the configuration of the anchoring member 36 to thereby relieve and absorb the tension imposed upon the strip 58. As shown in FIGS. 1A and 1B, the anchoring member 36 is deformed to thereby allow the strip 58 to be advanced a distance $d$ as measured from a point A upon the strip 58. In FIG. 1A, there is shown the anchoring member 36 in its normal, H-shaped configuration; in FIG. 1B, the strip 58 has been moved the distance $d$ under the influence of the strip withdrawing mechanism to thereby impose a tension upon the strip 58, which is absorbed effectively by the anchoring member 36. In accordance with the teachings of this invention, the anchoring member 36 as a result of its configuration and resiliency interacts with the chamber 20 to relieve the force exerted upon the strip 58. More specifically, the anchoring member 36 is rotated in a counterclockwise direction as shown in FIG. 1B about a point 53 of pivoting. The rotational motion of the anchoring member 36 is restricted by the surface 30 of the boss 28. It is particularly noted that the surface of the anchoring member 36 has a sufficient coefficient friction to engage the strip 58 and to prevent it from being pulled from around the member 36 and through the slot 18. As the anchoring member 36 is rotated against the surface 30, the strip 58 is effectively grasped by the outer surface of the member 36 and the surface 30. As force is continued to be exerted by the strip 58 upon the anchoring member 36, the anchoring member 36 is deformed thereby absorbing the force applied to the strip 58. In particular, both of the legs 39 and 40 are bent toward each other and may, if sufficient force is exerted, contact each other. In order to rotate the anchoring member 36 into a securing position within the chamber 20, the loop 60 of the strip 58 must be disposed about the anchoring member 36 so as to first orientate the leg 39 towards the arcuate surface 22 to establish the point 53 of pivoting. In FIG. 1B, the leading end 66 of the strip 58 is withdrawn through the slot 18 adjacent the point 53 of pivoting, whereas the extended length of the strip 58 (to which the unwinding or withdrawing force is applied) is withdrawn through the slot 18 so as to rotate the anchoring member 36 in a counterclockwise direction as shown in FIG. 1B thereby deforming the anchoring member 36.

Figure 4A:
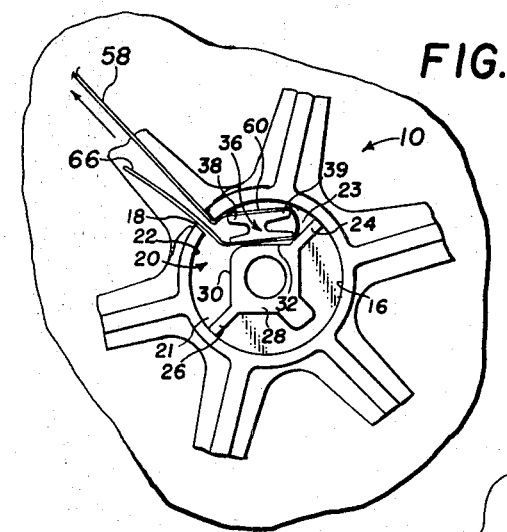
FIGS. 4A and 4B are side views of the reel of FIGS. 1A and 1B showing the reorientation of the anchoring member that has been incorrectly disposed within the hub of the reel.
Figure 4B:
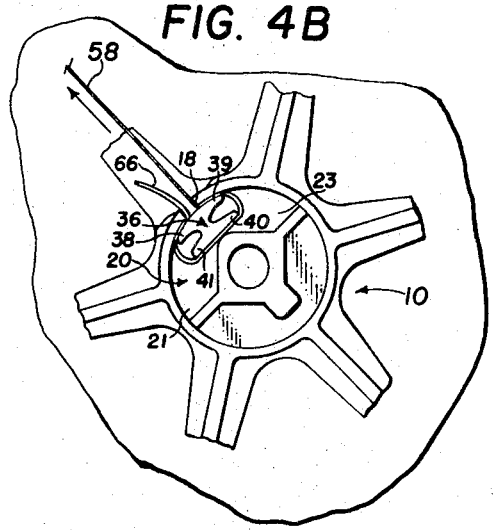

With regard to FIGS. 4A and 4B, there is shown what will happen when the loop 60 has been disposed about the anchoring member 36 with the extended length of the strip 58 withdrawn through the slot 18 so as to be unable to establish a point of pivoting. It is understood that force is exerted on the extended length of the strip 58 whereas the end 66 is withdrawn through the slot 18 and is left free. More specifically, the force exerted upon the extended length of the strip 58 tends to rotate the anchoring member 36 in a counterclockwise direction (as seen in FIGS. 4A and 4B) so as to tend to force the leg 38 away from the arcuate surface 22 of the chamber 20. Under these circumstances, the anchoring member 36 tends to be displaced as shown in FIG FIG. 4B from the second section 23 to the first section 21 of the chamber 20. It is noted that the opening between the boss 28 and the arcuate surface 22 is sufficient to allow the anchoring member 36 to pass therethrough. As shown in FIG. 4B, the anchoring member 36 is pulled in a counterclockwise motion into the first section 21 of the chamber 20 as the extended length of the strip 58 is pulled. Eventually, the anchoring member 36 will come to rest within the first section 21 as shown in FIGS. 1A and 1B, wherein the point of pivoting 53 will be established for the leg 39 and the anchoring member 36 will come to rest against the surface 30. Thus there has been shown a substantially symmetrically shaped anchoring member 36, which is capable of correctly orientating itself within either section 21 or 23 of the chamber 20 depending upon which end of the strip 58 a force is exerted. With regard to FIG. 4A, it may be understood that if the force was exerted upon the end 66 of the strip 58, that a point of pivoting would be established upon the leg 38 and that the anchoring member 36 would be rotated in a clockwise direction to abut against the surface 32 of the boss 28. Because of the substantially symmetrical nature of the chamber 20 and the anchoring member 36, the strip 58 may be looped about the anchoring member 36 in either a clockwise or counterclockwise direction to establish the anchoring member 36 in an engaging position within the chamber 20. If the operator does make a mistake in winding the loop 60 about the anchoring member 36, the anchoring member 36 will of itself slide into the other section of the chamber 20 to establish the point of pivoting and to be secured therein.

Figure 5:
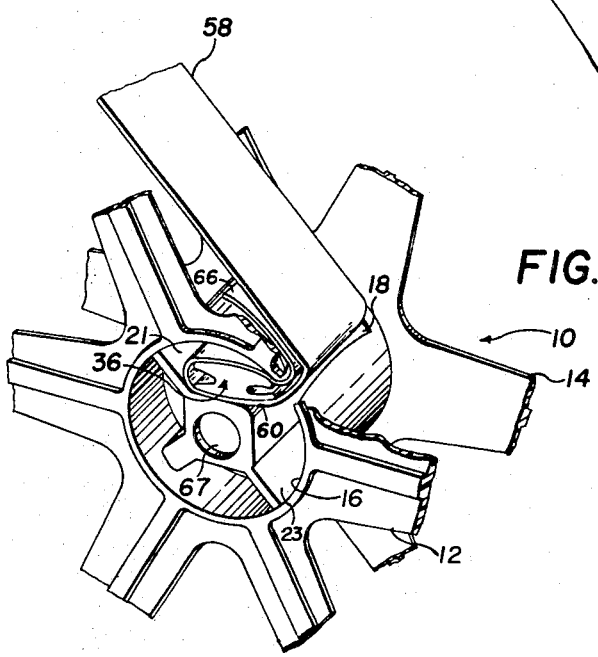
FIG. 5 is a perspective view of the reel and anchoring members of FIGS. 1A and 1B showing the increased radius of curvature presented to the strip by the leading end of the strip when the strip has been entirely unwound from the reel.

When the length of strip 58 has been entirely unwound from the reel 10, there is a tendency for the reel 10, due to its momentum, to continue to rotate thereby tending to press the strip 58 against the edges of the slot 18. As shown in FIG. 5, the strip 58 has been substantially entirely unwound from the reel 10, which has been rotated in a clockwise direction (see arrow) as shown in FIG. 5. By correctly winding the strip 58 upon the reel 10, the leading end 66 of the strip 58 may serve as a buffer between the strip 58 and an edge of the slot 18 and also may provide a greater radius about which the strip 58 is bent. As the reel 10 continues to rotate in a clockwise direction, the strip 58 is pressed towards an edge of the slot 18; however, the leading end 66 provides a resilient portion of an increased radius about which the strip 58 is curved to thereby decrease the chance of breaking the strip 58. Thus, with the anchoring member 36 disposed within the first section 21 of the chamber 10 chamber 20, the strip 58 should be wound initially upon the reel 10 in a clockwise direction as shown in FIG. 5. On the other hand, the anchoring member 36 may be disposed in the second section 23 of the chamber 20 to allow the strip 58 to be wound in a counterclockwise direction about the reel 10.

Figures 3A, 3B:
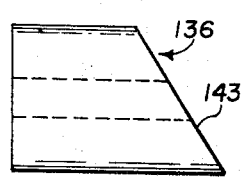
FIGS. 3A and 3B are respectively plan and front views of an alternative embodiment of the anchoring member of this invention.

Referring now to FIGS. 3A and 3B, an alternative embodiment of this invention may take the form of an anchoring member 136 which may be inserted within the loop 60 of the strip 58. More specifically, the anchoring member 136 includes an angled surface 143 to aid the insertion of the member 136 within the loop 60. Further, the anchoring member 136 includes a first set of legs 138 and 141, and a second set of legs 139 and 140 extending from opposite sides of the member 136. The top of the member 136 has a convex surface 144, and the bottom of the member 136 has a concave surface 145. It is believed that the embodiment shown in FIGS. 2A, 2B and 2C may be preferable to this alternate embodiment due to the presence of the greater length of the anchoring member about which to establish the point of pivoting.

Thus, there has been shown an anchoring member for securing an extended length of a strip to a reel so as to relieve forces exerted upon the strip. More specifically, the anchoring member of this invention is provided with resilient portions for absorbing the force exerted upon the strip and is disposed within a chamber of the reel so as to pivot about a point adjacent to the opening through which the strip is inserted into the chamber and to abut another portion of the chamber to thereby secure the anchoring member and strip within the chamber. In actual tests, an anchoring member and reel as described above have withstood several hundred unwinding operations before the strip has broke. In some instances, the strip as anchored by this invention was able to withstand these repeated tests without breaking. In contrast, when a solid member was disposed within the chamber of the above-described reel, a strip of photographic film was normally unable to survive 10 to 15 unwindings of the reel before breaking.

This invention has been described in detail with reference to preferred embodiments, but it will be understood that variations and modifications can be effected within the spirit and scope of the invention as described hereinabove and as defined in the appended claims.

I claim:

1. In combination: a hub for receiving convolutions of a strip to which strip a force may be applied, said hub having an opening for the insertion of a loop of the strip and a chamber therein for receiving the loop, said chamber having a first surface; and an anchoring member inserted within the loop to secure the strip to said hub, said anchoring member having resilient means for relieving the force exerted upon the strip, said chamber being configured to receive said anchoring member to facilitate rotation of said anchoring member under the influence of the force so that said anchoring member disposes the strip against said first surface thereby securing the strip to said hub.

2. A combination as claimed in claim 1, wherein said anchoring member is rotated within said chamber about a point proximate to said opening and said surface is disposed remotely from said opening.

3. A combination as claimed in claim 1, wherein the strip includes first and second ends, the force being exerted upon said first end, said anchoring member being disposed within said chamber so as to rotate about a point proximate to the second end of the strip so as to dispose said anchoring member against a first surface of said chamber remote from said opening.

4. A combination as claimed in claim 3, wherein said anchoring member is made of a resilient material and includes first and second legs extending therefrom, said first leg being pivotably disposed about said point, said second leg adapted to be depressed toward said first leg by the force exerted upon the first end of the strip.

5. A combination as claimed in claim 1, wherein said anchoring member is made of a resilient material and takes the form of an H-shaped member having first, second, third and fourth legs extending therefrom.

6. A combination as claimed in claim 5, wherein said chamber includes first and second sections separated from each other by a passage of a dimension to allow the passing of said anchoring member therethrough.

7. In combination, a reel about which a flexible strip may be wound, said reel having a hub with a first opening through which a loop of the flexible strip is insertable, and an anchoring member, said anchoring member being made of a resilient material and having first, second, third and fourth legs extending therefrom, said hub having a chamber therein with first and second sections interconnected by a second opening through which said anchoring member may be disposed, said anchoring member being disposable within the loop in either said first or second sections dependent upon which end of the strip a force is exerted.

8. A combination as claimed in claim 7, wherein said anchoring member is pivoted about said first leg and said second leg is depressed when said anchoring member is disposed within said first section, and said anchoring member is pivoted about said third leg and said fourth leg is depressed when said anchoring member is disposed within said second section.

9. An anchoring member for securing a flexible strip to a hub, a force applied to the flexible strip, said hub having an opening for the insertion of a loop of the strip and a chamber for receiving the loop, said anchoring member to be inserted within the loop and having a resilient portion against which the strip presses to deform said resilient portion, said anchoring member having a surface, said anchoring member being configured to facilitate the rotation of said anchoring member within the chamber under said influence of the force to coact with the chamber to thereby secure the strip therebetween.

10. An anchoring member as claimed in claim 9, wherein said anchoring member takes the form of an H-shaped member and is made of a resilient material.

11. An anchoring member as claimed in claim 9, wherein said surface has a coefficient of friction of sufficient magnitude to prevent the withdrawal of the strip from about said anchoring member.

12. In combination, a strip to which a force is applied, a hub to which said strip is secured, said hub having an opening for the insertion of a loop of said strip and a chamber therein for receiving said loop, said chamber having a first surface, and an anchoring member for being inserted within said loop, said anchoring member having a resilient portion and a second surface of a predetermined coefficient of friction, said anchoring member being configured to rotate within said chamber so that the force exerted upon said strip deforms said resilient portion and so that said second surface presses said strip against said first surface, said predetermined coefficient of friction being of sufficient magnitude to prevent said strip from being withdrawn from said chamber.

13. In combination, a hub having an opening for the insertion of a loop of a strip and a chamber therein for receiving the loop, and an anchoring member for being inserted within the loop, said anchoring member having at least one resilient portion, said anchoring member being disposed within said chamber to position said resilient portion so that said resilient projection is deformed when a substantially radial force is applied to the strip to thereby tend to absorb the aforementioned force.

14. In combination, a hub for receiving convolutions of a strip to which strip a force may be applied, said hub having means for defining a restricted opening for the insertion of the strip into said hub, and an anchoring member for being disposed within said hub to secure the strip to said hub, said anchoring member having resilient means and being disposed within said chamber to position said resilient means in substantial radial alinement with said restricted opening thereby tending to relieve the force.

15. In combination, a hub for receiving convolutions of a strip to which strip a force may be applied, said hub having means for defining a restricted opening for the insertion of a loop of the strip into said hub and having an interior surface, and an anchoring member for being inserted within the loop to secure the strip to said hub, said anchoring member having a resilient portion and a retaining surface, said chamber being configured to receive said anchoring member to facilitate rotation of said anchoring member so that said resilient portion is disposed in alinement with said restricted opening under the influence of the applied force and so that said anchoring member disposes the strip between said retaining and interior surfaces thereby securing the strip to said hub.

16. In combination, a hub about which may be wound and unwound a strip, said hub having a chamber and means for defining an opening restricted with respect to said chamber for the insertion of a loop of the strip into said chamber, and an anchoring member for being disposed within the loop to secure the strip to said hub, said anchoring member having resilient means and being disposed within said hub to position said resilient means with respect to said restricted opening to thereby relieve the tension placed upon the strip when the strip has been unwound from said hub.